US012671108B2

(12) United States Patent
Kim et al.

(10) Patent No.: US 12,671,108 B2
(45) Date of Patent: Jun. 30, 2026

(54) SHEET FOR BATTERY CASES HAVING GAS POCKET PORTION FORMED IN MOVEMENT DIRECTION, BATTERY CELL MANUFACTURED USING THE SAME, AND METHOD OF MANUFACTURING THE BATTERY CELL

(71) Applicant: LG Energy Solution, Ltd., Seoul (KR)

(72) Inventors: Hyun Beom Kim, Daejeon (KR); Gi Man Kim, Daejeon (KR); Dae Hong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 405 days.

(21) Appl. No.: 17/924,069

(22) PCT Filed: Nov. 1, 2021

(86) PCT No.: PCT/KR2021/015600
§ 371 (c)(1),
(2) Date: Nov. 8, 2022

(87) PCT Pub. No.: WO2022/098024
PCT Pub. Date: May 12, 2022

(65) Prior Publication Data
US 2023/0178791 A1     Jun. 8, 2023

(30) Foreign Application Priority Data

Nov. 3, 2020     (KR) ........................ 10-2020-0145023

(51) Int. Cl.
H01M 10/04 (2006.01)
H01M 10/058 (2010.01)
(Continued)

(52) U.S. Cl.
CPC ....... H01M 10/049 (2013.01); H01M 10/058 (2013.01); H01M 50/105 (2021.01); H01M 50/178 (2021.01); H01M 50/186 (2021.01)

(58) Field of Classification Search
CPC ............. H01M 10/049; H01M 10/058; H01M 50/105; H01M 50/178; H01M 50/116;
(Continued)

(56) References Cited

U.S. PATENT DOCUMENTS

2003/0049527 A1*   3/2003   Yageta ................ H01M 50/553
                                                     429/129
2007/0072071 A1    3/2007   Lee
(Continued)

FOREIGN PATENT DOCUMENTS

CN         101118976 A      2/2008
CN         101262047 A  *   9/2008   ........ H01M 10/0404
(Continued)

OTHER PUBLICATIONS

Translation of CN101262047A (Year: 2008).*
(Continued)

*Primary Examiner* — Nicholas A Smith
*Assistant Examiner* — Seamus Patrick Mcnulty
(74) *Attorney, Agent, or Firm* — Lerner David LLP

(57)          ABSTRACT

A sheet for battery cases, wherein a gas pocket portion and an electrode assembly receiving portion are alternately formed in a first direction, which is a movement direction of the sheet for battery cases, a long side of the electrode assembly receiving portion is parallel to the first direction, a short side of the electrode assembly receiving portion is parallel to a second direction perpendicular to the first direction, and a portion to be sealed is formed along each of opposite long sides of the electrode assembly receiving portion parallel to the first direction. A battery cell manu-
(Continued)

100 factured using the same, and a method of manufacturing the battery cell are also described.

10 Claims, 6 Drawing Sheets

(51) Int. Cl.

| | | |
|---|---|---|
| *H01M 50/105* | (2021.01) | |
| *H01M 50/178* | (2021.01) | |
| *H01M 50/186* | (2021.01) | |

(58) Field of Classification Search
CPC .... H01M 50/10; H01M 50/30; H01M 50/394; H01M 50/543
See application file for complete search history.

(56) References Cited

U.S. PATENT DOCUMENTS

| | | | |
|---|---|---|---|
| 2011/0151292 A1* | 6/2011 | Song ................. | H01M 10/0565 |
| | | | 29/623.2 |
| 2014/0113184 A1* | 4/2014 | Hamel .............. | H01M 10/0436 |
| | | | 429/163 |
| 2019/0237824 A1* | 8/2019 | Jin ...................... | H01M 50/553 |
| 2020/0067029 A1* | 2/2020 | Park .................... | H01M 50/105 |
| 2020/0185675 A1 | 6/2020 | Lee et al. | |
| 2020/0295315 A1 | 9/2020 | Kim et al. | |
| 2020/0373535 A1* | 11/2020 | Jo ....................... | H01M 50/105 |
| 2020/0403263 A1 | 12/2020 | Bae et al. | |
| 2023/0077553 A1 | 3/2023 | Bae et al. | |

FOREIGN PATENT DOCUMENTS

| | | | |
|---|---|---|---|
| CN | 102610860 | A | 7/2012 |
| CN | 209071529 | U | 7/2019 |
| CN | 110739486 | A | 1/2020 |
| CN | 111052475 | A | 4/2020 |
| EP | 3699992 | A1 | 8/2020 |
| JP | 2016009677 | A | 1/2016 |
| KR | 20000075255 | A | 12/2000 |
| KR | 20060111840 | A | 10/2006 |
| KR | 20070035876 | A | 4/2007 |
| KR | 20080082799 | A | 9/2008 |
| KR | 20120050207 | A | 5/2012 |
| KR | 101273472 | B1 | 6/2013 |
| KR | 20140017908 | A | 2/2014 |
| KR | 20170132565 | A | 12/2017 |
| KR | 20180106073 | A | 10/2018 |
| KR | 20190042800 | A | 4/2019 |
| KR | 20190055594 | A | 5/2019 |
| KR | 20200025909 | A | 3/2020 |

OTHER PUBLICATIONS

EESR for Application No. 21889489.7 dated Mar. 1, 2024. 6 pgs.
International Search Report for Application No. PCT/KR2021/015600 mailed Feb. 8, 2022, 2 pages.
Search Report dated Oct. 28, 24 from the Office Action for Chinese Application No. 202180026029.5 Issued Oct. 31, 2024, pp. 1-3. [see pp. 1-2, categorizing the cited references.].
Search Report dated Mar. 10, 2025 from the Office Action for Chinese Application No. 202180026029.5 Issued Mar. 12, 2025. 2 pages. [see pp. 1-2, categorizing the cited references.].

\* cited by examiner

【FIG. 1】
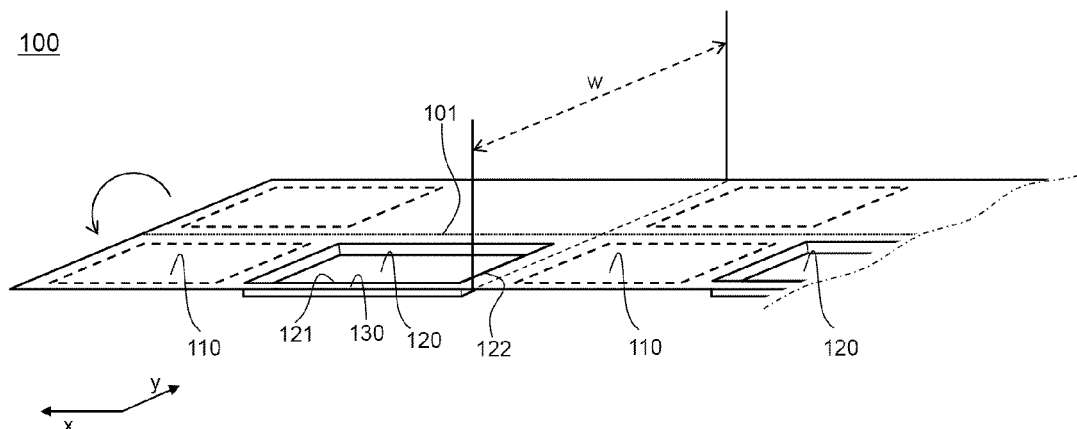
【FIG. 2】
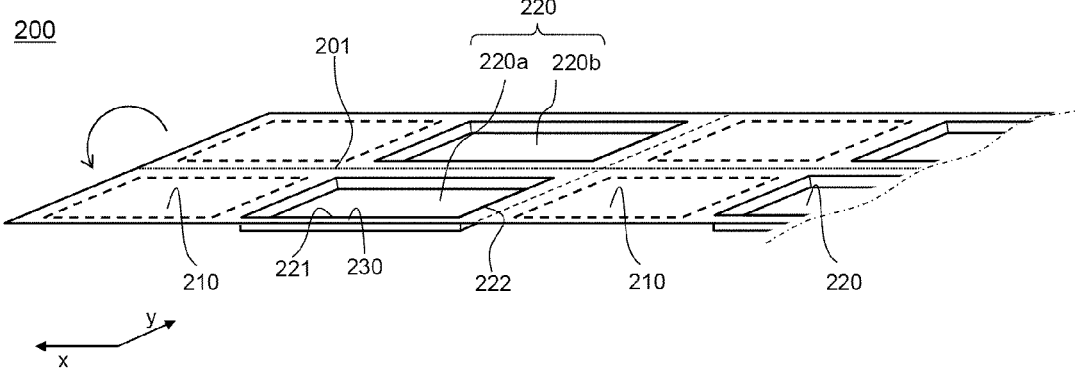

【FIG. 3】
300
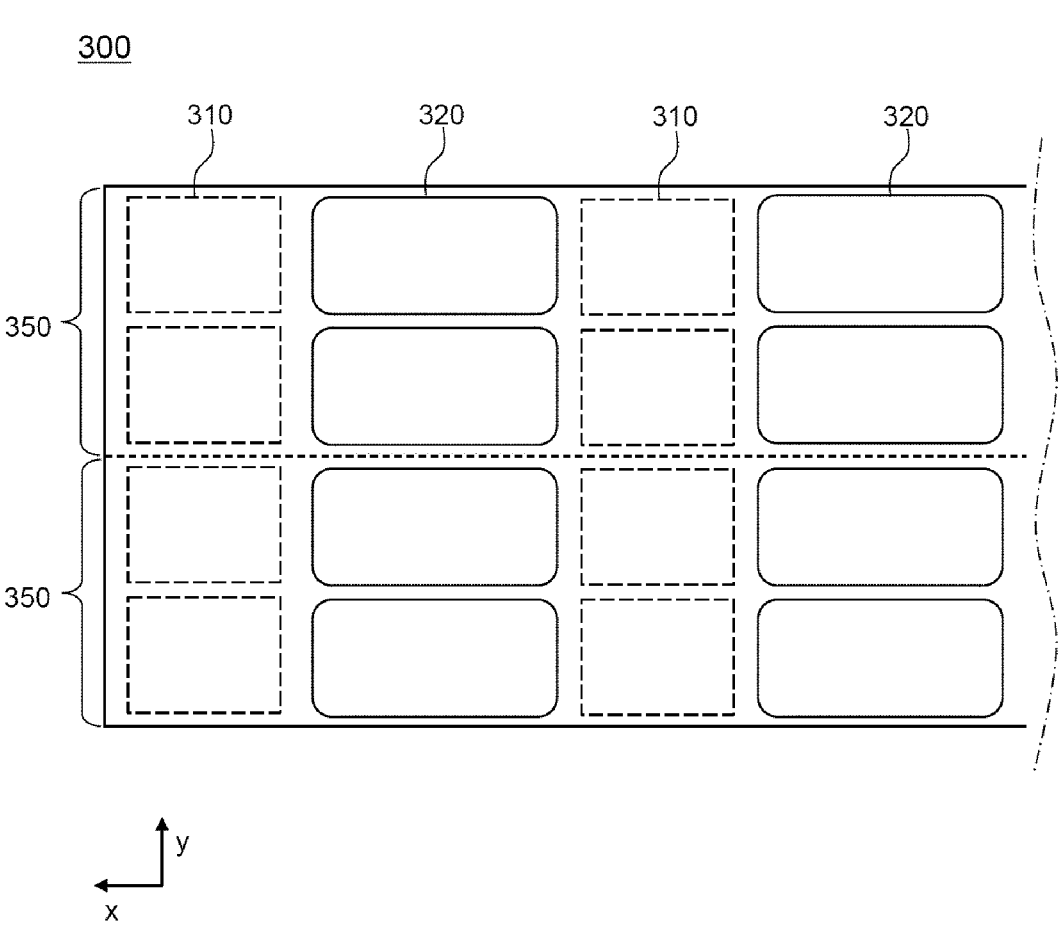

【FIG. 4】
<u>400</u>
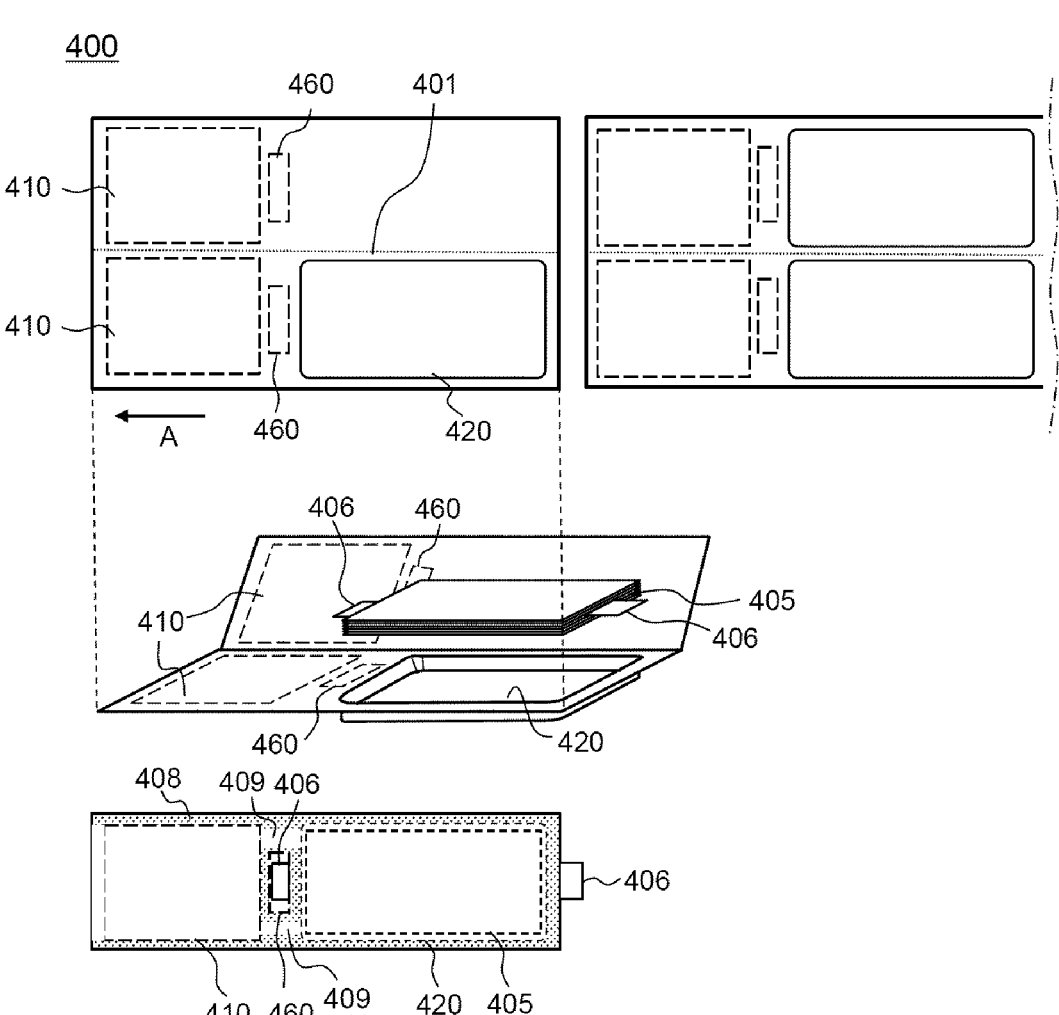

【FIG. 5】
(a)
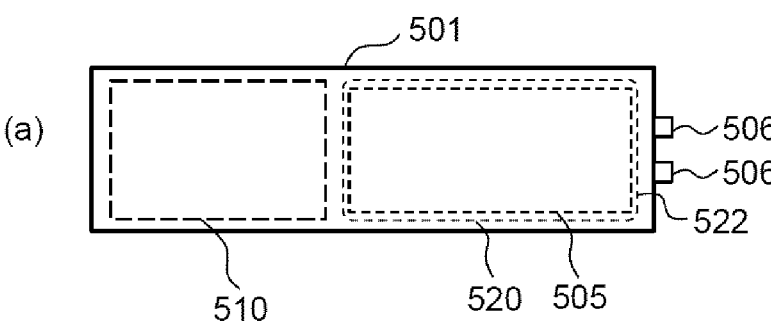
(b)
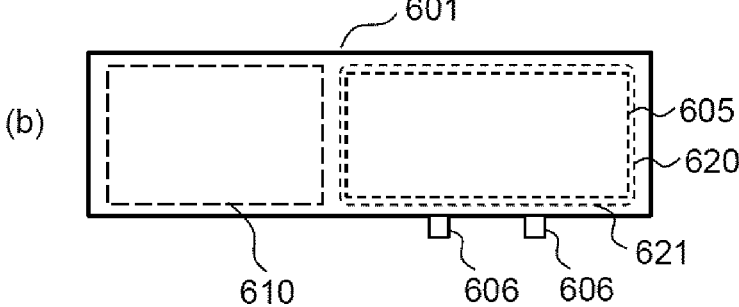

【FIG. 6】
(a)
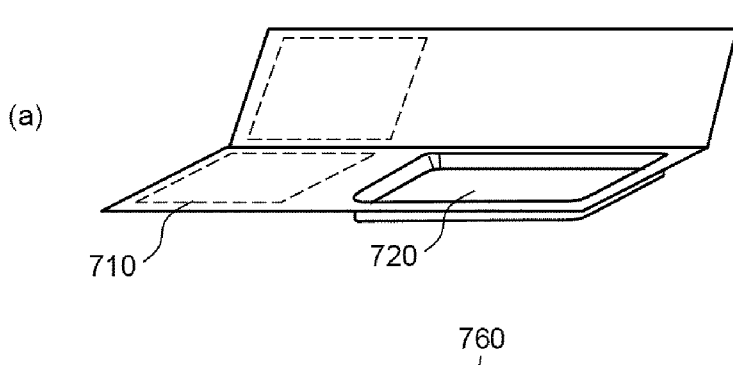
710    720
(b)
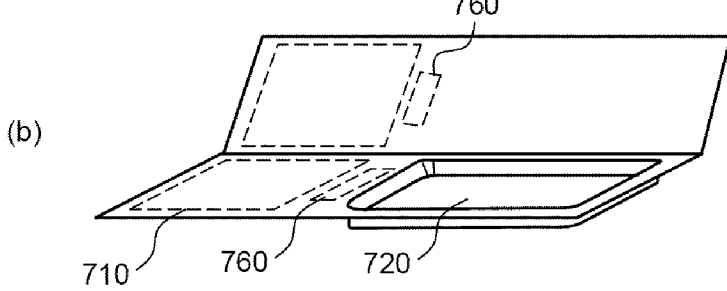
760
710    760    720
(c)
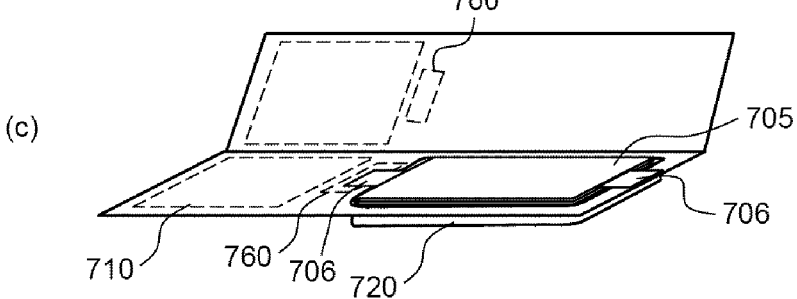
760
705
706
710    760    706    720
(d)
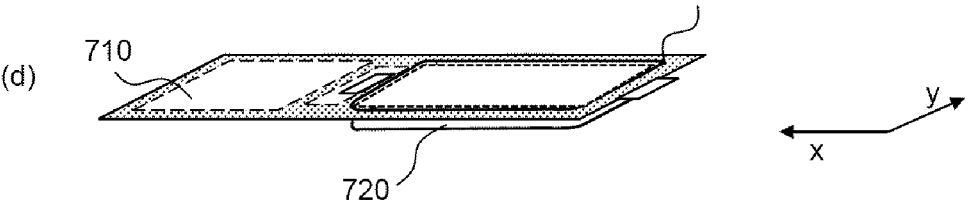
710    770
720
y
x 【FIG. 7】
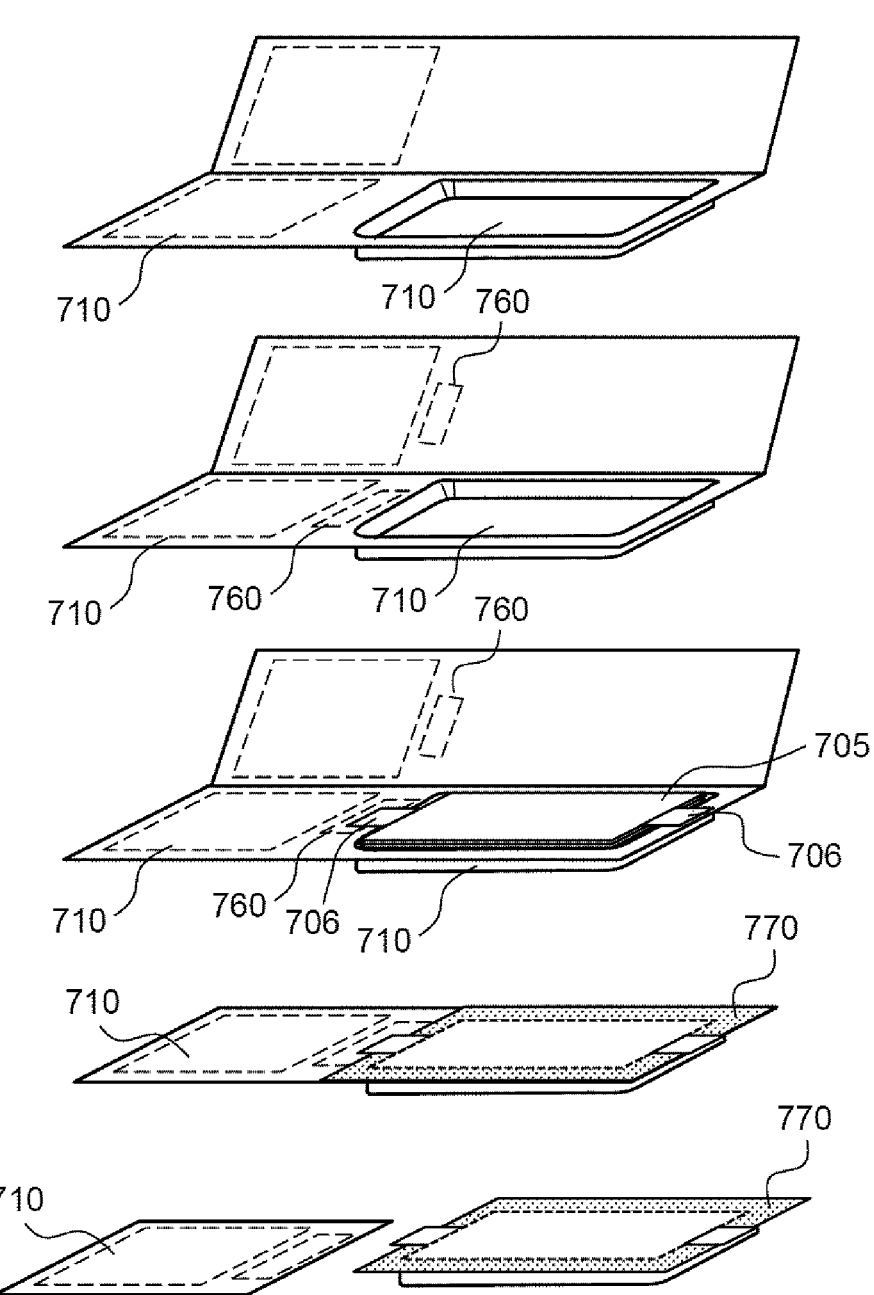

SHEET FOR BATTERY CASES HAVING GAS POCKET PORTION FORMED IN MOVEMENT DIRECTION, BATTERY CELL MANUFACTURED USING THE SAME, AND METHOD OF MANUFACTURING THE BATTERY CELL

CROSS-REFERENCE TO RELATED APPLICATIONS

The present application is a national phase entry under 35 U.S.C. § 371 of the International Application No. PCT/KR2021/015600, filed on Jan. 11, 2021, which claims priority from Korean Patent Application No. 10-2020-0145023 filed on Nov. 3, 2020, all of which are incorporated herein by reference in their entireties.

FIELD OF THE INVENTION

The present invention relates to a sheet for battery cases having a gas pocket portion formed in a movement direction, a battery cell manufactured using the same, and a method of manufacturing the battery cell. More particularly, the present invention relates to a sheet for battery cases having a gas pocket portion formed in a movement direction configured such that a large-sized electrode assembly receiving portion and a gas pocket portion capable of capturing a large amount of gas are formed in a sheet for pouch-shaped battery cases having a limited length, a battery cell manufactured using the same, and a method of manufacturing the battery cell.

BACKGROUND OF THE INVENTION

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

A lithium secondary battery used in an electric vehicle or an energy storage system (ESS) must be manufactured so as to have high capacity and high output. For example, it is necessary to reduce subsidiary materials configured to interconnect battery cells in a battery pack. In addition, it is possible to manufacture a battery pack having high energy density by increasing the size of the battery cell.

Depending on the material and shape of a battery case, the lithium secondary battery may be classified as a cylindrical battery cell having an electrode assembly mounted in a metal can, a prismatic battery cell having an electrode assembly mounted in a metal can, or a pouch-shaped battery cell having an electrode assembly mounted in a battery case made of a laminate sheet. The pouch-shaped battery cell has advantages of easy deformation and high energy density.

The pouch-shaped battery cell may be manufactured using a method of shaping a sheet for battery cases to form an electrode assembly receiving portion therein and sealing the outer periphery of the electrode assembly receiving portion by thermal fusion.

Since the sheet for battery cases is supplied in a state of being wound in the form of a roll, there is no problem in increasing the size of the electrode assembly receiving portion in a movement direction of the sheet for battery cases; however, there is a limitation in increasing the size of the electrode assembly receiving portion in a roll width direction of the sheet for battery cases.

Specifically, in the case in which, in order to manufacture a high-capacity battery cell, the size of the battery cell is increased, and therefore the pouch-shaped battery cell is manufactured, for example, so as to have a long side of 500 mm or more, there is a limitation in increasing the length of the electrode assembly receiving portion when the electrode assembly receiving portion and a gas pocket portion are formed in a lateral direction of the sheet for battery cases.

In addition, since the amount of gas generated in the electrode assembly also increases according to an increase in size of the battery cell, it is necessary to increase the size of the gas pocket portion to some extent or more. In the case in which the gas pocket portion is formed in the lateral direction of the sheet for battery cases, however, the size of the gas pocket portion is also limited.

Demand for high-capacity battery cells has increased even though the width of the roll type sheet for battery cases is not changed, as described above, and therefore there is a high necessity for technology capable of manufacturing a large-sized pouch-shaped battery cell.

BRIEF SUMMARY OF THE INVENTION

The present invention has been made in view of the above problems, and it is an object of the present invention to provide a sheet for battery cases having a gas pocket portion formed in a movement direction configured such that a large-sized pouch-shaped battery case is manufactured using a conventional sheet roll for battery cases, and the size of a gas pocket portion is also increased in response to an increase in size of a battery cell, whereby it is possible to reduce the amount of residual gas in a finished pouch-shaped battery cell, a battery cell manufactured using the same, and a method of manufacturing the battery cell.

A sheet for battery cases according to the present invention to accomplish the above object is configured such that a gas pocket portion and an electrode assembly receiving portion are alternately formed in a first direction, which is a movement direction of the sheet for battery cases, a long side of the electrode assembly receiving portion is parallel to the first direction, a short side of the electrode assembly receiving portion is parallel to a second direction perpendicular to the first direction, and a portion to be sealed is formed along each of opposite long sides of the electrode assembly receiving portion parallel to the first direction.

In the sheet for battery cases according to the present invention, the electrode assembly receiving portion may be a first receiving portion, and the first receiving portion may be formed on one side of the sheet for battery cases based on a first-direction central axis.

In the sheet for battery cases according to the present invention, the electrode assembly receiving portion may include a first receiving portion and a second receiving portion, and the first receiving portion and the second receiving portion may be formed respectively on both sides of the sheet for battery cases based on the first-direction central axis.

In the sheet for battery cases according to the present invention, the sheet for battery cases may be configured such that one battery case shaping line in which the gas pocket portion and the electrode assembly receiving portion are alternately disposed is formed in the first direction and two or more battery case shaping lines are formed in the second direction.

In the sheet for battery cases according to the present invention, an opening configured to allow an electrode lead to be exposed therethrough may be formed between the gas pocket portion and the electrode assembly receiving portion.

The present invention provides a battery cell according to a first embodiment, manufactured using the sheet for battery cases, wherein a bidirectional electrode assembly having electrode leads extending outwards therefrom so as to face opposite short sides of the electrode assembly receiving portion is received in the electrode assembly receiving portion, an opening configured to allow the electrode lead to be exposed therethrough is formed between the gas pocket portion and the electrode assembly receiving portion, and a sealed portion is formed at least a part of the periphery of the opening.

In addition, the present invention provides a battery cell according to a second embodiment, manufactured using the sheet for battery cases, wherein a unidirectional electrode assembly having electrode leads extending outwards therefrom so as to face a short side of the electrode assembly receiving portion that is not adjacent to the gas pocket portion is received in the electrode assembly receiving portion, and a gas movement path is formed between the gas pocket portion and the electrode assembly receiving portion.

In addition, the present invention provides a battery cell according to a third embodiment, manufactured using the sheet for battery cases, wherein a unidirectional electrode assembly having electrode leads extending outwards therefrom so as to face a long side of the electrode assembly receiving portion is received in the electrode assembly receiving portion, and a gas movement path is formed between the gas pocket portion and the electrode assembly receiving portion.

A method of manufacturing the battery cell according to the first embodiment includes shaping a sheet for battery cases to form a gas pocket portion and an electrode assembly receiving portion therein, forming an opening between the gas pocket portion and the electrode assembly receiving portion, receiving an electrode assembly in the electrode assembly receiving portion, and sealing a portion to be sealed of the sheet for battery cases, wherein the electrode assembly receiving portion and the gas pocket portion are alternately formed in a first direction parallel to a movement direction of the sheet for battery cases.

In addition, an electrode lead of the electrode assembly may be exposed through the opening.

A method of manufacturing the battery cell according to the second embodiment or the third embodiment includes shaping a sheet for battery cases to form a gas pocket portion and an electrode assembly receiving portion therein, receiving an electrode assembly in the electrode assembly receiving portion, and sealing a portion to be sealed of the sheet for battery cases, wherein the electrode assembly receiving portion and the gas pocket portion are alternately formed in a first direction parallel to a movement direction of the sheet for battery cases.

The method of manufacturing the battery cell according to the first embodiment may further include forming sealed portions at opposite sides of the electrode lead exposed through the opening and removing the gas pocket portion after the sealing step.

As is apparent from the above description, in the present invention, a gas pocket portion and an electrode assembly receiving portion are formed in a movement direction of a sheet for battery cases, whereby it is possible to increase the length of a short side of the electrode assembly receiving portion, compared to a conventional structure in which the gas pocket portion and the electrode assembly receiving portion are formed side by side in a lateral direction of the sheet for battery cases.

In addition, the gas pocket portion is formed in the movement direction of the sheet for battery cases, whereby it is possible to increase the size of the gas pocket portion.

Consequently, the size of a space capable of capturing gas generated during initial charging and discharging is increased, whereby it is possible to reduce the amount of residual gas in a pouch-shaped battery cell.

In addition, an opening is formed between the gas pocket portion and the electrode assembly receiving portion, whereby it is possible to use a bidirectional electrode assembly.

In addition, it is possible to form a plurality of battery case shaping lines, in each of which the electrode assembly receiving portion and the gas pocket portion are alternately arranged, in the lateral direction of the sheet for battery cases.

BRIEF DESCRIPTION OF THE DRAWINGS

FIG. 1 is a partial perspective view of a sheet for battery cases having a gas pocket portion and a first receiving portion formed therein.

FIG. 2 is a partial perspective view of a sheet for battery cases having a gas pocket portion, a first receiving portion, and a second receiving portion formed therein.

FIG. 3 is a partial plan view of a sheet for battery cases having two battery case shaping lines formed therein.

FIG. 4 shows a pouch-shaped battery cell having a bidirectional electrode assembly received in a battery case having an opening formed therein.

FIGS. 5(a) and (b) are plan views of a pouch-shaped battery cell having a unidirectional electrode assembly received in a battery case.

FIGS. 6(a)-6(d) show a battery cell manufacturing method according to the present invention.

FIG. 7 shows a battery cell manufacturing method further including a step of removing a gas pocket portion added to FIG. 6.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

A sheet for battery cases according to the present invention may be a laminate sheet configured to have a structure in which an outer resin layer, an air and moisture blocking metal layer, and a thermally fusible inner resin layer are stacked. Alternatively, the sheet for battery cases may be a laminate sheet further including an adhesive layer between the outer resin layer and the metal layer and between the metal layer and the inner resin layer.

It is required for the outer resin layer to exhibit excellent tolerance to an external environment, and therefore more than predetermined tensile strength and weather resistance are necessary. In this aspect, a polymer resin constituting the outer resin layer may include polyethylene naphthalate (PEN), polyethylene terephthalate (PET), or oriented nylon, which exhibits excellent tensile strength and weather resistance. The outer resin layer may be configured to have a two-layer structure in which different materials are stacked.

Polyethylene naphthalate (PEN) has better tensile strength and weather resistance than polyethylene terephthalate (PET) even in a small thickness, and is preferably used as the outer resin layer.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. These materials may be used alone or in the form of a combination of two or more thereof.

A polymer resin that exhibits thermal fusibility, has low hygroscopicity to the electrolytic solution, and is not expanded or eroded by the electrolytic solution may be used as the inner resin layer. More preferably, the inner resin layer is made of cast polypropylene (CPP).

In the present invention, a gas pocket portion and an electrode assembly receiving portion are continuously formed in a sheet for battery cases wound in the form of a roll while being unwound in an x-axis direction, wherein the size of a long side of a pouch-shaped battery cell can be freely increased as needed. Since the width w of the sheet for battery cases is fixed, however, an increase in the size of a short side of the pouch-shaped battery cell is limited, although the size of the long side of the pouch-shaped battery cell can be freely increased.

In the present invention, therefore, the position of the gas pocket portion, which is conventionally formed in a line together with the electrode assembly receiving portion in a width direction of the sheet for battery cases, is changed in order to increase the size of the short side of the pouch-shaped battery cell.

Among outer peripheries of the electrode assembly receiving portion, therefore, the other outer peripheries, excluding the outer periphery formed between the gas pocket portion and the electrode assembly receiving portion, are sealed after an electrode assembly is received in the electrode assembly receiving portion, and at least a part of the outer periphery formed between the gas pocket portion and the electrode assembly receiving portion is not sealed, wherein gas generated in the electrode assembly may move to the gas pocket portion, and an electrolytic solution may be injected into the electrode assembly receiving portion, through the non-sealed outer periphery.

Since the amount of gas that is generated during initial charging and discharging increases when the size of the pouch-shaped battery cell is increased, it is necessary to widen the gas pocket portion. In the case in which the gas pocket portion is formed in the x-axis direction based on the electrode assembly receiving portion, it is possible to form a wide gas pocket portion.

In the drawings of the present application, a non-sealed region of the sheet for battery cases is shown as becoming the gas pocket portion; however, the shape of the gas pocket portion is not limited thereto. For example, the gas pocket portion may have a structure having a recess formed therein, as in the electrode assembly receiving portion.

FIG. 1 is a partial perspective view of a sheet for battery cases having a gas pocket portion and a first receiving portion formed therein.

Referring to FIG. 1, the sheet 100 for battery cases according to the present invention is configured such that a gas pocket portion 110 and an electrode assembly receiving portion 120 are alternately formed in a first direction (x), which is a movement direction, a long side 121 of the electrode assembly receiving portion 120 is parallel to the first direction (x), a short side 122 of the electrode assembly receiving portion 120 is parallel to a second direction (y), which is perpendicular to the first direction (x), and a portion to be sealed 130 is formed along each of opposite long sides 121 of the electrode assembly receiving portion 120 parallel to the first direction (x).

The sheet 100 for battery cases of FIG. 1 is configured such that the sheet for battery cases is folded in an overlapping fashion along a bending line 101 in a direction indicated by an arrow and is then sealed and such that one battery case is formed within the width of the sheet 100 for battery cases.

That is, the bending line 101 is formed along a first-direction central axis of the sheet 100 for battery cases, and a first receiving portion, as the electrode assembly receiving portion, is formed on one side of the sheet 100 for battery cases based on the first-direction central axis.

FIG. 2 is a partial perspective view of a sheet for battery cases having a gas pocket portion, a first receiving portion, and a second receiving portion formed therein.

Referring to FIG. 2, the sheet 200 for battery cases is configured such that a gas pocket portion 210 and an electrode assembly receiving portion 220 are alternately formed in a first direction (x), which is a movement direction, a long side 221 of the electrode assembly receiving portion 220 is parallel to the first direction (x), a short side 222 of the electrode assembly receiving portion 220 is parallel to a second direction (y), which is perpendicular to the first direction (x), and a portion to be sealed 230 is formed along each of opposite long sides 221 of the electrode assembly receiving portion 220 parallel to the first direction (x).

The sheet 200 for battery cases is configured such that the sheet for battery cases is folded in an overlapping fashion along a bending line 201 in a direction indicated by an arrow and is then sealed and such that one battery case is formed within one width of the sheet 200 for battery cases.

That is, the electrode assembly receiving portion 220 includes a first receiving portion 220a and a second receiving portion 220b, the bending line 201 is formed along a first-direction central axis of the sheet 200 for battery cases, and the first receiving portion 220a and the second receiving portion 220b are formed respectively on both sides of the sheet 200 for battery cases based on the first-direction central axis.

FIG. 3 is a partial plan view of a sheet for battery cases having two battery case shaping lines formed therein.

Referring to FIG. 3, the sheet 300 for battery cases is configured such that one battery case shaping line 350 in which a gas pocket portion 310 and an electrode assembly receiving portion 320 are alternately disposed is formed in a first direction (x) and such that two battery case shaping lines 350 are formed in a second direction (y).

The number of battery case shaping lines may be two or more depending on the width of the sheet for battery cases and the size of a pouch-shaped battery cell.

FIG. 4 shows a pouch-shaped battery cell having a bidirectional electrode assembly received in a battery case having an opening formed therein.

Referring to FIG. 4, an electrode assembly receiving portion 420 is formed only on one side of a sheet 400 for battery cases based on a bending line 401, and gas pocket portions 410 are formed on both sides of the sheet for battery cases based on the bending line 401. The gas pocket portion 410 and the electrode assembly receiving portion 420 are alternately formed in a movement direction A of the sheet 400 for battery cases, and an opening 460, through which an electrode lead 406 is exposed, is formed between the gas pocket portion 410 and the electrode assembly receiving portion 420.

A sheet portion corresponding to one battery case is cut from the sheet 400 for battery cases, an electrode assembly 405 having electrode leads 406 protruding outwards therefrom in opposite directions so as to face opposite short sides of the electrode assembly receiving portion is received in the electrode assembly receiving portion 420, and outer peripheries of the electrode assembly receiving portion 420 and outer peripheries of the gas pocket portion 410 are sealed to form sealed portions 408.

The electrode lead 406 may be exposed through the opening 460. An electrolytic solution may be injected into the electrode assembly receiving portion 420, and gas generated in the electrode assembly may move to the gas pocket portion 410, through non-sealed portions 409 provided at opposite sides of the opening 460.

Subsequently, the non-sealed portions 409 may be thermally fused so as to be sealed, and the pocket portion 410 may be removed by cutting.

FIGS. 5(a) and (b) are plan views of a pouch-shaped battery cell having a unidirectional electrode assembly received in a battery case.

Referring to FIGS. 5(a) and (b), battery cells are configured such that sheets for battery cases are bent along bending lines 501 and 601 and are sealed by thermal fusion.

In FIG. 5(a), a unidirectional electrode assembly 505 having electrode leads 506 extending outwards therefrom so as to face a short side 522 of an electrode assembly receiving portion 520 that is not adjacent to a gas pocket portion 510 is received in the electrode assembly receiving portion 520, and gas may move through a non-sealed portion between the gas pocket portion 510 and the electrode assembly receiving portion 520.

In FIG. 5(b), a unidirectional electrode assembly 605 having electrode leads 606 extending outwards therefrom so as to face a long side 621 of an electrode assembly receiving portion 620 is received in the electrode assembly receiving portion 620, and gas may move through a non-sealed portion between the gas pocket portion 610 and the electrode assembly receiving portion 620.

FIGS. 6(a)-(d) show a battery cell manufacturing method according to the present invention.

FIGS. 6(a)-(d) show a method of manufacturing the battery cell shown in FIG. 4. Specifically, referring to FIGS. 6(a)-(d), the battery cell manufacturing method may include (a) a step of shaping a sheet for battery cases to form a gas pocket portion 710 and an electrode assembly receiving portion 720 therein, (b) a step of forming an opening 760 between the gas pocket portion 710 and the electrode assembly receiving portion 720, (c) a step of receiving an electrode assembly 705 in the electrode assembly receiving portion, and (d) a step of sealing a portion to be sealed of the sheet for battery cases to form a sealed portion 770, wherein the electrode assembly receiving portion 720 and the gas pocket portion 710 may be alternately formed in a first direction (x) parallel to a movement direction of the sheet for battery cases. For the convenience of description, however, FIGS. 6(a)-(d) show the state in which a sheet portion necessary to manufacture one battery case is cut from the sheet for battery cases.

FIG. 6(d) shows the state in which all outer peripheries of the electrode assembly receiving portion 720 are sealed after gas generated when an electrolytic solution is injected and first charging and discharging are performed moves to the gas pocket portion 710.

At this time, an electrode lead 706 of the electrode assembly 705 is exposed through the opening 760.

In an embodiment, a method of manufacturing the battery cell shown in FIG. 5, configured such that no opening is formed in a sheet for battery cases, may include (a) a step of shaping a sheet for battery cases to form a gas pocket portion and an electrode assembly receiving portion therein, (b) a step of receiving an electrode assembly in the electrode assembly receiving portion, and (c) a step of sealing a portion to be sealed of the sheet for battery cases, wherein the electrode assembly receiving portion and the gas pocket portion may be alternately formed in a first direction (x) parallel to a movement direction of the sheet for battery cases.

FIG. 7 shows a battery cell manufacturing method further including a step of removing the gas pocket portion added to FIG. 6.

Referring to FIG. 7, steps (a) to (d) are performed in the same manner as in FIG. 6, and a step of forming sealed portions 770 at opposite sides of the electrode lead 706 exposed through the opening 760 and removing the gas pocket portion 710 is included after step (d).

The size of the pouch-shaped battery cell may be increased through the above process, whereby it is possible to manufacture a high-capacity battery cell.

Those skilled in the art to which the present invention pertains will appreciate that various applications and modifications are possible within the category of the present invention based on the above description.

DESCRIPTION OF REFERENCE SYMBOLS

100, 200, 300, 400: Sheets for battery cases
101, 201, 401, 501, 601: Bending lines

110, 210, 310, 410, 510, 610, 710: Gas pocket portions
120, 220, 320, 420, 520, 620, 720: Electrode assembly receiving portions
121, 221, 621: Long sides
122, 222, 522: Short sides
130, 230: Portions to be sealed
220*a*: First receiving portion
220*b*: Second receiving portion
350: Battery case shaping line
405, 505, 605, 705: Electrode assemblies
406, 506, 606, 706: Electrode leads
408, 770: Sealed portions
409: Non-sealed portion
460, 760: Openings
w: Width of sheet for battery cases
x: First direction
y: Second direction As is apparent from the above description, in the present invention, a gas pocket portion and an electrode assembly receiving portion are formed in a movement direction of a sheet for battery cases, whereby it is possible to increase the length of a short side of the electrode assembly receiving portion, compared to a conventional structure in which the gas pocket portion and the electrode assembly receiving portion are formed side by side in a lateral direction of the sheet for battery cases.

In addition, the gas pocket portion is formed in the movement direction of the sheet for battery cases, whereby it is possible to increase the size of the gas pocket portion.

Consequently, the size of a space capable of capturing gas generated during initial charging and discharging is increased, whereby it is possible to reduce the amount of residual gas in a pouch-shaped battery cell.

In addition, an opening is formed between the gas pocket portion and the electrode assembly receiving portion, whereby it is possible to use a bidirectional electrode assembly.

In addition, it is possible to form a plurality of battery case shaping lines, in each of which the electrode assembly receiving portion and the gas pocket portion are alternately arranged, in the lateral direction of the sheet for battery cases.

The invention claimed is:

1. A sheet for battery cases, comprising:
a first gas pocket portion a first electrode assembly receiving portion, a second gas pocket portion, and a second electrode assembly receiving portion alternately formed in a first direction, wherein the first direction is a movement direction of the sheet for battery cases, wherein the movement direction is an unwinding direction of the sheet for battery case wound in a form of a roll;
wherein a long side of the first electrode assembly receiving portion is parallel to the first direction,
wherein a short side of the first electrode assembly receiving portion is parallel to a second direction perpendicular to the first direction,
wherein the electrode assembly is a bidirectional electrode assembly having electrode leads extending outwards therefrom so as to face opposite short sides of the first electrode assembly receiving portion, and
the sheet further comprising a portion to be sealed formed along each of opposite long sides of the first electrode assembly receiving portion parallel to the first direction, and
a plurality of openings configured to allow an electrode lead of the electrode leads to be exposed therethrough, wherein a first of the plurality of openings is defined between the first gas pocket portion and the first electrode assembly receiving portion and a second of the plurality of openings is defined between the second gas pocket portion and the second electrode assembly,
wherein the sheet includes a bending line extending parallel to the first direction,
wherein the first gas pocket portion comprises a first pocket on a first side of the bending line and a second pocket on a second side of the bending line and the second gas pocket portion comprises a third pocket on the first side of the bending line and a fourth pocket on the second side of the bending line, and
wherein the electrode assembly receiving portion is disposed on the first side of the bending line.

2. The sheet according to claim 1,
wherein the first receiving portion is formed on one side of the sheet for battery cases based on a first-direction central axis.

3. The sheet according to claim 1, wherein the first electrode assembly receiving portion comprises a first receiving sub-portion and a second receiving sub-portion, and
wherein the first receiving sub-portion and the second receiving sub-portion are formed respectively on both sides of the sheet for battery cases based on a first-direction central axis.

4. The sheet according to claim 1, wherein the sheet for battery cases is configured such that:
one battery case shaping line in which the first gas pocket portion and the first electrode assembly receiving portion are alternately disposed is formed in the first direction between the first electrode assembly receiving portion and the second gas pocket portion; and
two or more battery case shaping lines are formed in the second direction.

5. A battery cell manufactured using the sheet according to claim 1, comprising:
a first bidirectional electrode assembly having electrode leads extending outwards therefrom so as to face opposite short sides of the first electrode assembly receiving portion received in the first electrode assembly receiving portion, and
a sealed portion formed at at least a part of a periphery of the plurality of openings.

6. A method of manufacturing the battery cell according to claim 5, the method comprising:
(a) shaping the sheet for battery cases to form first gas pocket portion and a first electrode assembly receiving portion, the second gas pocket portion, and the second electrode assembly receiving portion therein;
(b) forming a first of the plurality of openings between the first gas pocket portion and the first electrode assembly receiving portion and a second of the plurality of openings between the second gas pocket portion and the second electrode assembly receiving portion;
(c) receiving the electrode assembly in the first electrode assembly receiving portion; and
(d) sealing the portion to be sealed of the sheet for battery cases, wherein
the first gas pocket portion, the first electrode assembly receiving portion the second gas pocket portion, and the second electrode assembly receiving portion are alternately formed in the first direction parallel to the movement direction of the sheet for battery cases.

7. The method according to claim 6, wherein an electrode lead of the electrode assembly is exposed through the at least one of plurality of openings.

8. The method according to claim 6, further comprising forming sealed portions at opposite sides of the electrode lead exposed through the at least one of the plurality of openings and removing the first gas pocket portion after the sealing step.

9. The sheet according to claim 1, wherein the first electrode assembly receiving portion comprises a first pocket on the first side of the bending line and a second pocket on the second side of the bending line.

10. The sheet according to claim 1, further comprising:

a third gas pocket portion, and a fourth gas pocket portion formed along a second direction perpendicular to the first direction subsequent to the first gas pocket portion and the second gas pocket portion, respectively, and a third electrode assembly receiving portion, and a fourth electrode assembly receiving portion formed along the second direction subsequent to the first electrode assembly receiving portion and the second electrode assembly receiving portion, respectively.

\* \* \* \* \*